Patented June 7, 1938

2,120,006

UNITED STATES PATENT OFFICE 2,120,006

MOLDING ORGANIC COMPOUNDS

Daniel E. Strain, Wilmington, Del., assignor, by mesne assignments, to E. I. du Pont de Nemours & Company, Wilmington, Del., a corporation of Delaware No Drawing. Application April 26, 1935, Serial No. 18,392

12 Claims. (Cl. 18—55)

This invention relates to the molding of organic compounds and, more particularly, relates to molding compositions comprising intimate admixtures of polymeric mono-methacrylic acid esters and monomeric methacrylic acid esters, the molding of same, and the molded articles obtained.

Heretofore, polymeric mono-methacrylic acid esters have been molded under heat and pressure but this has been done at temperatures appreciably in excess of the softening temperature of the ultimate molded article. Since these polymeric esters are thermoplastic, it was quite natural that the art should follow this procedure.

An object of the present invention is to provide polymeric mono-methacrylic acid ester molding compositions of a new type capable of being molded more readily and under more varying conditions. A further object is to provide methods of molding such compositions. Other objects of the invention will be apparent from the description given hereinafter.

The above objects are accomplished according to the present invention by intimately admixing a polymeric mono-methacrylic acid ester with a monomeric methacrylic acid ester and molding the resulting composition under pressure.

It has been found that, by intimately admixing a polymeric mono-methacrylic acid ester with from 10–100%, by weight thereof, of a monomeric mono- or poly-methacrylic acid ester, the resulting molding composition could be molded very readily under widely varying conditions and to give molded articles of widely varying properties, and that advantages resulted therefrom not obtainable by molding a composition comprised essentially of a polymeric mono-methacrylic acid ester either entirely free of, or containing negligible amounts of, a monomeric methacrylic acid ester.

By polymethacrylic acid ester as used herein is meant a polyhydric alcohol ester of methacrylic acid in which more than one hydroxyl is esterified.

To better understand the invention, the monomer component of the monomer-polymer mixture may be considered as a fugitive active plasticizer for the polymer component. That is, the monomer component is a solvent for the polymer component and permits the composition to be more readily molded at lower temperature and/or pressure, as a permanent plasticizer would, and yet, after the molding operation, the monomer component has been transformed into polymer and no longer functions as a plasticizer; it is fugitive. The function of the monomer is not entirely that of a fugitive plasticizer, however, as under certain conditions it adds strength to the molded article and, where it is a different methacrylic acid ester from the polymer, it modifies the properties of the resulting molded article according to its particular properties. It should be understood that this invention is not based on interpolymerization as the polymer component of the molding composition cannot form an interpolymer; on the other hand, the resulting molded article is not a simple mixture of polymers such as would be obtained by mixing two polymers in granular form, or the like, and molding same. The fact that the polymer at least partially dissolves in the monomer in the molding compositions of this invention, is believed to account for the difference in properties of articles molded therefrom as compared to the properties of articles molded from a mixture of the polymers of the corresponding methacrylic acid esters.

One method according to the present invention is to intimately admix a polymeric mono-methacrylic acid ester, preferably methyl methacrylate, with 10% or more, by weight thereof, of a monomeric methacrylic acid ester and mold the resulting composition at a temperature below the softening temperature of the ultimate molded product.

Another method according to the present invention comprises molding these monomer-polymer mixtures, particularly a mixture of monomeric methyl methacrylate and polymeric methyl methacrylate, at relatively high temperatures, the resulting molded product having appreciably greater strength than an article made by molding polymeric methyl methacrylate alone under the same conditions.

By selecting the monomeric methacrylic acid ester to be admixed with the polymeric methacrylic acid ester, it is possible to vary the physical properties of the ultimate molded article to best fit it for its intended use. As an illustration of this, may be cited the selection of a monomeric poly-methacrylic acid ester whereby the softening point of the ultimate molded object may be raised far above the softening point that would have been obtained if only the polymeric mono-methacrylic acid ester had been employed.

The following specific examples illustrate the modification of the invention where molding of the monomer-polymer compositions takes place at relatively high temperatures to give molded articles of higher than ordinary strength:

*Example 1.*—1 part of benzoyl peroxide is dissolved in 100 parts of methyl methacrylate monomer. This solution is stirred into 300 parts of finely divided methyl methacrylate polymer and the batch is allowed to stand for 24 hours in a closed container. 7½ grams of the composition are charged into a cold 2" disc mold and pressed 5 minutes at 175° C. under 3000 pounds per square inch pressure. The molding at the end of the 5 minute period is quickly chilled and removed from the mold.

Discs prepared according to this example show appreciably greater strength than discs of unmodified methyl methacrylate polymer molded under the same conditions.

*Example 2.*—14 parts of monomeric methyl methacrylate are mixed thoroughly with 86 parts of finely divided methyl methacrylate polymer and the batch is allowed to stand for 24 hours in a closed container. The resulting composition is molded as in Example 1 except for the use of a 6 minute molding cycle at 190° C. Discs molded according to this example likewise show appreciably greater strength than discs obtained by molding unmodified methyl methacrylate polymer under similar conditions.

In the following specific examples is illustrated the modification of the invention where molding of the monomer-polymer mixtures takes place at a temperature below the softening point of the ultimate molded article, so that the article may be immediately ejected from the mold, without fear of deformation, at the temperature of molding, thereby eliminating the necessity of first cooling the mold before ejecting the article:

*Example 3.*—A molding composition prepared as in Example 1 is charged into a mold heated to 100° C. and pressed 5 minutes at this temperature and a pressure of 2000 pounds per square inch. The molding is discharged without cooling the mold and no danger of deformation is present as the molded article softens at about 112° C.

*Example 4.*—40 parts of methyl methacrylate monomer containing 1% benzoyl peroxide are worked with 100 parts of polymeric methyl methacrylate until a homogeneous mixture is obtained. The mixture is then charged into a die previously heated to 90° C. and pressed under 2000 pounds per square inch pressure for 10 minutes. A clear molded article is obtained which can be safely ejected from the die at the molding temperature.

*Example 5.*—A solution is prepared from 120 grams of glycol di-methacrylate monomer, 1.2 grams of benzoyl peroxide and 1.5 grams of stearic acid. This solution is added to 180 grams of finely divided methyl methacrylate polymer and the composition is mixed for 20 seconds in a "Banbury" mixer. The product is discharged as a soft white dough. This composition is charged into a mold and molded at a temperature of 105–110° C. using a heating period of 5 minutes and pressure of 2000 pounds per square inch. The molded article may be ejected from the mold at the molding temperature without deformation.

*Example 6.*—25 parts of cyclohexyl methacrylate monomer containing 1% benzoyl peroxide are stirred into 75 parts of finely powdered methyl methacrylate polymer, and allowed to stand 48 hours at room temperature. This composition is charged into a mold previously heated to 110° C. and pressed under 2000 pounds per square inch pressure for 5 minutes. The molding is ejected without cooling the die, and is sufficiently rigid to resist deformation.

*Example 7.*—5 parts of glycol dimethacrylate monomer containing 1% benzoyl peroxide are mixed with 95 parts of finely powdered methyl methacrylate polymer, and the mixture allowed to stand at room temperature for 48 hours. This composition is charged into a die previously heated to 110° C. and pressed under 4000 pounds per square inch pressure for 10 minutes. A molding which softens at 116° C. and which can be ejected from the die without danger of deformation is obtained.

*Example 8.*—25 parts of glycol dimethacrylate monomer containing 1% benzoyl peroxide are stirred into 75 parts of finely powdered methyl methacrylate polymer, and the mixture allowed to stand for 48 hours at room temperature. This composition is charged into a die previously heated to 110° C. and pressed under 2000 pounds per square inch pressure for 7 minutes. A molding which softens at 128° C. and which can be discharged from the die at the molding temperature without danger of deformation is obtained.

*Example 9.*—75 parts of methyl methacrylate polymer are worked into a mixture of 25 parts of glycol dimethacrylate monomer containing 1% benzoyl peroxide and 5 parts of dibutyl phthalate, the mixture charged into a die previously heated to 100° C. and pressed under 2000 pounds per square inch pressure for 10 minutes. A product is obtained which can be discharged from the die at the molding temperature without danger of deformation.

*Example 10.*—To 40 parts of glycol dimethacrylate monomer containing 1% benzoyl peroxide is added 0.01 part of an oil-soluble red dye and the mixture worked until the dye has completely dissolved in the monomer. The dyed monomer is added to 60 parts of methyl methacrylate polymer and the mixture worked until homogeneous, then charged into a die previously heated to 130° C. and pressed at 2000 pounds per square inch pressure for 5 minutes. A clear red product which softens at 137° C. and which suffers no deformation at 130° C. is obtained.

*Example 11.*—25 parts of cyclohexane glycol dimethacrylate monomer containing 1% benzoyl peroxide are stirred into 75 parts of finely powdered methyl methacrylate polymer, and the mixture allowed to stand for 10 hours at room temperature. This composition is charged into a die previously heated to 110° C. and pressed under 2000 pounds per square inch pressure for 7 minutes. A product is obtained which can be discharged from the die at the molding temperature without danger of deformation.

*Example 12.*—40 parts of cyclohexyl methacrylate monomer containing 1% benzoyl peroxide are stirred into 60 parts of finely powdered methyl methacrylate polymer, and the mixture allowed to stand for 24 hours at room temperature. This composition is charged into a die previously heated to 110° C. and pressed under 2000 pounds per square inch pressure for 5 minutes. A product is obtained which can be discharged from the die at the molding temperature without danger of deformation.

*Example 13.*—A mixture of 12.5 parts of methyl allyl methacrylate monomer and 12.5 parts of methyl methacrylate monomer, said mixture containing 1% benzoyl peroxide, is stirred into 75 parts of finely powdered methyl methacrylate polymer and allowed to stand for 36 hours at room temperature. This composition is charged into a die previously heated to 110° C. and pressed at 2000 pounds per square inch pressure for 7 minutes. A product is obtained which can be discharged from the die at the molding temperature without danger of deformation.

It will be understood that the above examples are merely illustrative and that the invention may be varied widely. Any other polymeric mono-methacrylic acid ester may be used in place of the particular esters of the examples. It is preferred to employ the methyl, ethyl, propyl, isobutyl, or cyclohexyl ester of methacrylic acid but others may be used such as phenyl methacrylate, methyl, ethyl, and butyl ether of ethylene glycol monomethacrylates, butyl carbitol methacrylate, dodecyl and octadecyl methacrylates, methacrylyl urea, and methacrylamide, or interpolymers thereof.

Instead of the monomeric methacrylic acid esters used in the examples, any other mono- or poly-methacrylic acid ester may be used. Among such esters may be mentioned those listed in the preceding paragraph and also diethylene glycol dimethacrylate, triethylene glycol dimethacrylate, decamethylene glycol dimethacrylate, and glyceryl dimethacrylate.

The selection of a specific monomeric ester to be used with any particular polymeric ester will be determined, to some extent, on the properties desired in the ultimate molded product. In many instances, an article is desired having a higher softening point than that of the polymeric ester used. In such cases the increased softening point can be conveniently obtained by selecting as the monomeric ester, a dimethacrylate. These dimethacrylates increase the softening point, also the hardness of the molded product in proportion to the amount used. For example, a 5% glycol dimethacrylate monomer— 95% methyl methacrylate polymer composition produces a molded product softening at about 116° C., while by increasing the proportion of dimethacrylate monomer to 44% and molding under substantially the same conditions, a molding is obtained which softens at about 180° C. In fact, if the proportion of dimethacrylate monomer is increased sufficiently, a substantially infusible molding can be obtained.

The proportion of monomer to polymer used in the present invention will be varied considerably according to the particular result desired. In general, the proportion of polymer will be in excess and the use of appreciably less than 10%, by weight of the polymer, of monomer is of little practical value as it does not have sufficient effect on the molding properties of the mixture. It has been found that, for practical purposes, the proportion of monomer should be kept between about 10% and 100% by weight of the polymer used, that is, it seldom would be advisable to use more monomer than polymer in these compositions. More usually a proportion of 10% to 60%, by weight of the polymer used, of monomer will be employed.

The monomer and polymer can be admixed in any manner but the admixing should be intimate so that a substantially homogeneous product is obtained. Depending upon the physical form of the polymer and the proportion and characteristics of monomer and polymer, the resulting composition to be molded may vary from a free flowing granular molding compound to a composition which is sticky and gummy and may even be in the form of an extremely viscous liquid, although this latter would be rather unusual. In one form of the invention, the polymer is in granular form and the proportion of monomer added is not so great as to appreciably affect the free flowing property of the polymer. In ordinary molding apparatus it is generally more convenient to work with a free flowing granular compound. The admixing of monomer and polymer may be carried out by simply stirring the monomer in the polymer and allowing the mixture to stand for some time so that the monomer may swell up the polymer. On the other hand, the monomer and polymer may be vigorously mixed in a masticator mixer such as a "Banbury" mixer in order that a completely homogeneous composition may be obtained in a matter of a minute or less. Where the monomer-polymer composition is sticky and gummy, it may be taken from the mixing apparatus and worked on the colloid rolls for a short time and then drawn off in slabs from which blanks of suitable size may be cut and these blanks molded. It will be seen that the particular manner of mixing the monomer and polymer and the particular form in which it is introduced into the molds can be varied through all of the known practice without departing from the spirit of this invention.

As to the molding conditions, the presence of monomer in the molding composition allows the use of a lower pressure and/or temperature than would be used in molding a straight polymer molding composition. The pressure employed is usually between 1000–3000 pounds per square inch, the temperature above 70° C. and as high as 200° C., and the molding cycle from 1–10 or more minutes. Molding conditions will be varied according to the particular composition being molded, the properties desired in the molded article, and the method of molding to be used. Ordinarily, in high speed mass production, the molding cycle should be between 1–10 minutes and it is generally true of these compositions that a molding temperature of 80° C. or more, certainly not less than 70° C., is required to polymerize the monomer and satisfactorily mold the material within this time cycle, even in the presence of a polymerization catalyst.

It will thus be seen that, with respect to high speed production of molded articles, the modification of this invention wherein the composition is molded at a temperature below the softening point of the ultimate molded article, is more or less limited to monomer-polymer mixtures which give a molded article having a softening temperature appreciably above 80° C. Of the mono-methacrylic acid esters, methyl methacrylate and cyclohexyl methacrylate are examples of compounds which give molded products having a softening point sufficiently above 80° C. to make the use of this temperature for molding feasible according to the present invention. On the other hand, a large number of the monomethacrylates, as for example ethyl methacrylate, give molded products having softening points below 80° C. when used alone. However, many of these esters when used as the polymer ingredient in combination with a substantial proportion of a monomeric dimethacrylate give molded products with softening temperatures far enough above 80° C. to make the use of a molding temperature of 80° C. feasible according to this modification of the invention.

It will be understood that the low temperature molding procedure is by no means limited to monomer-polymer mixtures giving molded products having a softening temperature above 70° C. or 80° C., or any other specific temperature, since it is also useful in molding where long time cycles are not particularly objectionable and it is necessary to mold at lower temperatures than heretofore possible. With methyl methacrylate polymer, which appears to be the ester of greatest importance today, a molding cycle of 1–10 minutes and a molding temperature of 80° C. or above, is entirely suitable, regardless of whether the monomer used in combination therewith is methyl methacrylate or some dimethacrylate to give a higher softening temperature, since the softening point of the molded article is sufficiently high to eject the article without cooling.

It is not necessary to use a polymerization catalyst in the present process but its use is so advantageous in reducing the time of the molding cycle that it would ordinarily be employed. In the examples, benzoyl peroxide has been used as the polymerization catalyst but other polymerization catalysts can also be used such as barium peroxide, sodium peroxide, ozonides, hydrogen peroxide, peracetic acid, and other peracids.

As will occur to those skilled in the art, the usual auxiliary agents may be incorporated with the monomer-polymer mixtures. Plasticizers may be incorporated into either the monomer or polymer prior to molding, and suitable plasticizers include dibutyl phthalate, tricresyl phosphate, diethyl phthalate, phthalide, triacetin, diacetin, dibutyl tartrate, diamyl succinate, et cetera. Also, pigments may be incorporated such as lithopone, titanium oxide, and the like; fillers as china clay, asbestine, wood flour, and the like; dyes, cellulose derivatives, natural and synthetic resins, and other modifying agents.

When pigments and fillers are used, it is preferred to incorporate these into the polymer-monomer composition by working in an internal type of mixer such as a "Banbury" mixer. However, pigments or fillers may be dispersed in the monomer by grinding in a pebble mill, or the like, and this mixture then worked into the polymer in a Banbury mixer, a Werner-Pfleiderer mixer, or by working on the colloid rolls.

In the specific examples the softening temperatures given have been the temperatures at which a molded chip ⅛″ in thickness and 2″ in diameter can first be flexed or bent by pressing between the fingers. It is evident that this softening temperature is far above that at which the molded article shows any degree of flow.

Where it is desired to mold the monomer-polymer compositions of the present invention at relatively high temperatures in order to secure molded articles of extraordinary strength, a temperature of at least 150° C. would usually be employed. Practically it is not desirable to go much above 200° C., although this temperature can be exceeded if desired.

The present invention has provided a method of molding methacrylic acid ester polymers under widely varying conditions. According to one modification, the molding compositions of the present invention may be molded at relatively high temperatures to obtain molded articles of unusual strength. According to another modification, the present invention has provided a highly practical and unique method of molding methacrylic acid esters at a temperature below the softening temperature of the ultimate molded article. This means that the molded articles can be ejected from the molds right at the temperature of molding without cooling and, in effect, allows the art to use the highly economical molding technique designed for the heat hardening plastics with this particular type of thermoplastic material. Furthermore, this invention has provided a process which will enable the art to mold polymeric methacrylates at appreciably lower temperatures than heretofore possible, thus permitting the inclusion of materials in the molding that would have been deleteriously affected by the high temperatures heretofore necessary.

As many apparently widely different embodiments of this invention may be made without departing from the spirit and scope thereof, it is to be understood that the invention is not limited to the specific embodiments thereof except as defined in the appended claims.

I claim:
1. Process of molding methacrylic acid esters which comprises intimately admixing a preformed polymeric mono-methacrylic acid ester with a monomeric methacrylic acid ester and molding the resulting composition under pressure and at an elevated temperature whereby said monomeric ester is polymerized.

2. Process of molding methacrylic acid esters which comprises intimately admixing preformed polymeric methyl methacrylate with a monomeric methacrylic acid ester and molding the resulting composition under pressure and at an elevated temperature whereby said monomeric ester is polymerized.

3. Process of molding methacrylic acid esters which comprises intimately admixing preformed polymeric methyl methacrylate with monomeric methyl methacrylate and molding the resulting composition under pressure and at an elevated temperature whereby said monomeric methyl methacrylate is polymerized.

4. Process of molding methacrylic acid esters which comprises intimately admixing a preformed polymeric mono-methacrylic acid ester with a monomeric methacrylic acid ester and molding the resulting composition under pressure and at a temperature lower than the softening temperature of the ultimate molded article.

5. Process of molding methacrylic acid esters which comprises intimately admixing preformed polymeric methyl methacrylate with a monomeric methacrylic acid ester and molding the resulting composition under pressure and at a temperature lower than the softening temperature of the ultimate molded article.

6. Process of molding methacrylic acid esters which comprises intimately admixing a preformed polymeric mono-methacrylic acid ester with a monomeric methacrylic acid ester and molding the resulting composition under pressure at a temperature above 150° C.

7. Process of molding methacrylic acid esters which comprises intimately admixing preformed polymeric methyl methacrylate with monomeric methyl methacrylate and molding the resulting composition under pressure at a temperature above 150° C.

8. A composition adapted to be molded under pressure and at an elevated temperature, comprising an intimate admixture of a preformed polymeric mono-methacrylic acid ester and a monomeric methacrylic acid ester.

9. A composition adapted to be molded under pressure and at an elevated temperature, comprising an intimate admixture of preformed polymeric methyl methacrylate and a monomeric methacrylic acid ester.

10. A composition adapted to be molded under pressure and at an elevated temperature, comprising an intimate admixture of preformed polymeric methyl methacrylate and monomeric methyl methacrylate.

11. A high strength molded methyl methacrylate article, said article being obtained by molding an intimate admixture of preformed polymeric methyl methacrylate and 10-60% by weight thereof of monomeric methyl methacrylate under pressure at a temperature above 150° C.

12. A granular composition adapted to be molded under pressure and at an elevated temperature, comprising an intimate admixture of a preformed polymeric mono-methacrylic acid ester and 10-60% by weight thereof of a monomeric methacrylic acid ester.

DANIEL E. STRAIN.